US012333929B2

(12) United States Patent
Murata

(10) Patent No.: US 12,333,929 B2
(45) Date of Patent: *Jun. 17, 2025

(54) DATA MEASUREMENT SYSTEM AND METHOD OF PERFORMING DATA PROCESSING OF MEASUREMENT DATA

(71) Applicant: Shimadzu Corporation, Kyoto (JP)

(72) Inventor: Koichi Murata, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/031,098

(22) PCT Filed: Oct. 15, 2021

(86) PCT No.: PCT/JP2021/038228
§ 371 (c)(1),
(2) Date: Aug. 10, 2023

(87) PCT Pub. No.: WO2022/080484
PCT Pub. Date: Apr. 21, 2022

(65) Prior Publication Data
US 2023/0377452 A1 Nov. 23, 2023

(30) Foreign Application Priority Data
Oct. 16, 2020 (JP) ................. 2020-174542

(51) Int. Cl.
G08C 15/12 (2006.01)
(52) U.S. Cl.
CPC .................. G08C 15/12 (2013.01)

(58) Field of Classification Search
CPC .................. G08C 15/12; H04Q 9/00
See application file for complete search history.

(56) References Cited

U.S. PATENT DOCUMENTS 7,072,813 B2    7/2006  Billemaz et al.
9,884,330 B2 *  2/2018  Humpal ............... B05B 12/12
(Continued)

FOREIGN PATENT DOCUMENTS

JP     5316047 A       11/1993
JP     2014-128452 A   7/2014
(Continued)

OTHER PUBLICATIONS

Creact Corporation, CAPTIV-L7000 solution "CAPTIV(Software and Wireless Sensors)—Software" (2017).
(Continued)

Primary Examiner — Amine Benlagsir
(74) Attorney, Agent, or Firm — Muir Patent Law, PLLC

(57) ABSTRACT

The trigger signal includes a first group of pulses—indicating start timing and a second group of pulses indicating end timing of data processing. The data processing apparatus processes measurement data sets measured during a period between the start timing and the end timing by temporally align the measurement data sets with each other. Each of the first group of pulses and the second group of pulses includes a first pulse and a second pulse different in pulse width from each other. The start timing is timing distant by a first time period from the first pulse or timing distant by a second time period from the second pulse in the first group of pulses, and the end timing is timing distant by the first time period from the first pulse or timing distant by the second time period from the second pulse in the second group of pulses.

12 Claims, 9 Drawing Sheets

(56) References Cited

U.S. PATENT DOCUMENTS

| | | | | |
|---|---|---|---|---|
| 10,872,044 B1* | 12/2020 | Campbell | ............... | G06F 13/20 |
| 2018/0078754 A1* | 3/2018 | Perez | ................. | A61N 1/36034 |
| 2019/0020949 A1* | 1/2019 | Uchida | ................. | H04R 3/005 |
| 2019/0251989 A1* | 8/2019 | Kondo | ..................... | G04G 5/04 |
| 2020/0064847 A1* | 2/2020 | Zhang | ..................... | G01S 7/487 |

FOREIGN PATENT DOCUMENTS

| | | |
|---|---|---|
| JP | 2017199980 A | 11/2017 |
| JP | 201921966 A | 2/2019 |
| JP | 2019041156 A | 3/2019 |
| WO | 2017221968 A1 | 12/2017 |

OTHER PUBLICATIONS

Creact Corporation, CAPTIV-L7000 solution "CAPTIV(Wireless Sensors and Measurements)—Hardware" (2017).

PCT Written Opinion of the International Searching Authority (Form PCT/ISA/237) for PCT application No. PCT/JP2021/038228 dated Jan. 18, 2022.

Tobii Corporate, Tobii Pro Glasses 2 User's Manual, version 1.1.3 (Nov. 2020), downloaded from https://www.tobiipro.com/siteassets/tobii-pro/user-manuals/tobii-pro-glasses-2-user-manual.pdf/?v=1.1.3.

Office Action dated Mar. 14, 2024 for corresponding application No. CN 202180069873.6.

Creact Corporation, CAPTIV-L7000 solution 'CAPTIV(Software and Wireless Sensors)-Software'.

Creact Corporation, CAPTIV-L7000 solution 'CAPTIV(Wireless Sensors and Measurements)-Hardware'.

Decision of Refusal dated Jul. 30, 2024, for corresponding Japanese Patent Application No. 2022-534922.

Extended European Search Report dated Jun. 18, 2024 for corresponding application No. EP 21837587.

Notice of Reasons for Refusal dated Feb. 27, 2024 for counterpart application No. JP 2022-534922.

PCT Written Opinion of the International Searching Authority (Form PCT/ISA/237), for PCT application No. PCT/JP2021/017850, dated Aug. 17, 2021.

Notice of Reasons for Refusal dated May 13, 2025, for corresponding Japanese Patent Application No. 2022-534922.

* cited by examiner

DATA MEASUREMENT SYSTEM AND METHOD OF PERFORMING DATA PROCESSING OF MEASUREMENT DATA

TECHNICAL FIELD

The present invention relates to a data measurement system and a method of performing data processing of measurement data, and more particularly to a technology to present data sets measured by a plurality of measurement apparatuses, as being in synchronization on a time-series basis.

BACKGROUND ART

Studies about analysis of human's operations have recently been conducted. For example, Non-Patent Literature (NPL 1) below introduces a system for visualizing postures during works based on a plurality of motion sensors and biological sensors attached to a worker and images during works by the worker. The system shown in NPL 1 aims to improve productivity by improving work environments by recognizing and analyzing loads imposed on the worker during works.

NPL 2 discloses an eye tracker representing an exemplary biological sensor applicable to a system as above. The eye tracker disclosed in NPL 2 includes an input terminal for an external signal for starting and quitting measurement.

CITATION LIST

Non Patent Literature

NPL 1: Creact Corporation, CAPTIV-L7000 solution, https://www.creact.cojp/item/measure/ergonomics/captiv-l7000/l7000-top NPL 2: Tobii Corporate, Tobii Pro Glasses 2 User's Manual, https://www.tobiipro.com/siteassets/tobii-pro/user-manuals/tobii-pro-glasses-2-user-manual.pdf/?v=1.1.3

SUMMARY OF INVENTION

Technical Problem

In operation analysis as above, it is important to know relation on a time-series basis among image information for recording operations of a subject, biological information representing a state of the subject, such as a body temperature and pulses, and environmental information representing a state of an environment where the subject is located, such as an air temperature and noise. Such information is often obtained by individual measurement apparatuses such as a camera, a biological sensor, and a temperature and humidity sensor.

In order to synchronize measurement data sets obtained by a plurality of measurement apparatuses on a time-series basis, a common trigger signal may wirelessly be broadcast from a specific transmitter to the plurality of measurement apparatuses and timings of the trigger signal included in the measurement data sets recorded in the measurement apparatuses are aligned to synchronize the plurality of measurement data sets. In such a case, when a measurement apparatus is unable to correctly receive the trigger signal from the transmitter due to temporary radio disturbance etc., recorded measurement data cannot be synchronized in subsequent processing.

The present invention was made to solve problems as above, and an object thereof is to, in a system that collects and presents measurement data sets obtained from a plurality of measurement apparatuses, more reliably synchronize on a time-series basis the obtained measurement data.

Solution to Problem

A data measurement system according to one aspect of the present invention includes a plurality of measurement apparatuses, a data processing apparatus that performs data processing of data sets obtained from the plurality of measurement apparatuses, respectively, and a transmitter that wirelessly transmits a trigger signal associated with the data processing to the plurality of measurement apparatuses. The trigger signal includes a first group of pulses indicating start timing of the data processing and a second group of pulses indicating end timing of the data processing. The data processing apparatus obtains the data sets which are measured during a period between the start timing and the end timing, and temporally align the data sets with each other by aligning start timings of the data sets with each other and aligning end timings of the data sets with each other to obtain processed measurement data from the plurality of measurement apparatuses. Each of the first group of pulses and the second group of pulses includes a first pulse and a second pulse successively transmitted at a prescribed interval. The first pulse and the second pulse are different from each other in pulse width. The start timing is timing distant by a first prescribed time period from generation of the first pulse in the first group of pulses or timing distant by a second prescribed time period from generation of the second pulse in the first group of pulses. The end timing is timing distant by the first prescribed time period from generation of the first pulse in the second group of pulses or timing distant by the second prescribed time period from generation of the second pulse in the second group of pulses.

A method according to another aspect of the present invention relates to a method of performing data processing of measurement data in a data measurement system including a plurality of measurement apparatuses. The data measurement system includes a transmitter that transmits a trigger signal associated with the data processing and a data processing apparatus. The trigger signal includes including a first group of pulses indicating start timing of the data processing and a second group of pulses indicating end timing of the data processing. The method includes (i) wirelessly transmitting, by the transmitter, the trigger signal to the plurality of measurement apparatuses, (ii) obtaining, by the data processing apparatus, data sets which are measured during a period between the start timing and the end timing, and (iii) temporally aligning, by the data processing apparatus, the data sets with each other by aligning start timings of the data sets with each other and aligning end timings of the data sets with each other to obtain processed measurement data from the plurality of measurement apparatuses. Each of the first group of pulses and the second group of pulses includes a first pulse and a second pulse successively transmitted at a prescribed interval. The first pulse and the second pulse are different from each other in pulse width. The start timing is timing distant by a first prescribed time period from generation of the first pulse in the first group of pulses or timing distant by a second prescribed time period from generation of the second pulse in the first group of pulses. The end timing is timing distant by the first prescribed time period from the generation of first pulse in the second group of pulses or timing distant by the second prescribed time period from generation of the second pulse in the second group of pulses.

Advantageous Effects of Invention

According to the data measurement system according to the present invention, data during a period from start timing to end timing based on the trigger signal (the first group of pulses and the second group of pulses) transmitted from a common transmitter in measurement data obtained from each of the plurality of measurement apparatuses is processed with start timings being temporally aligned and with end timings being temporally aligned. At this time, each of the first group of pulses and the second group of pulses of the trigger signal includes two pulsed signals (the first pulse and the second pulse) different in pulse width from each other, and each of the start timing and the end timing is set based on the timing distant by the first prescribed time period from generation of the received first pulse or the timing distant by the second prescribed time period from generation of the received second pulse. Thus, so long as each measurement apparatus is able to receive at least one pulsed signal included in the trigger signal, the data processing apparatus can synchronize measurement data. Therefore, obtained measurement data sets can more reliably be synchronized on a time-series basis.

DESCRIPTION OF EMBODIMENTS

Figure 1:
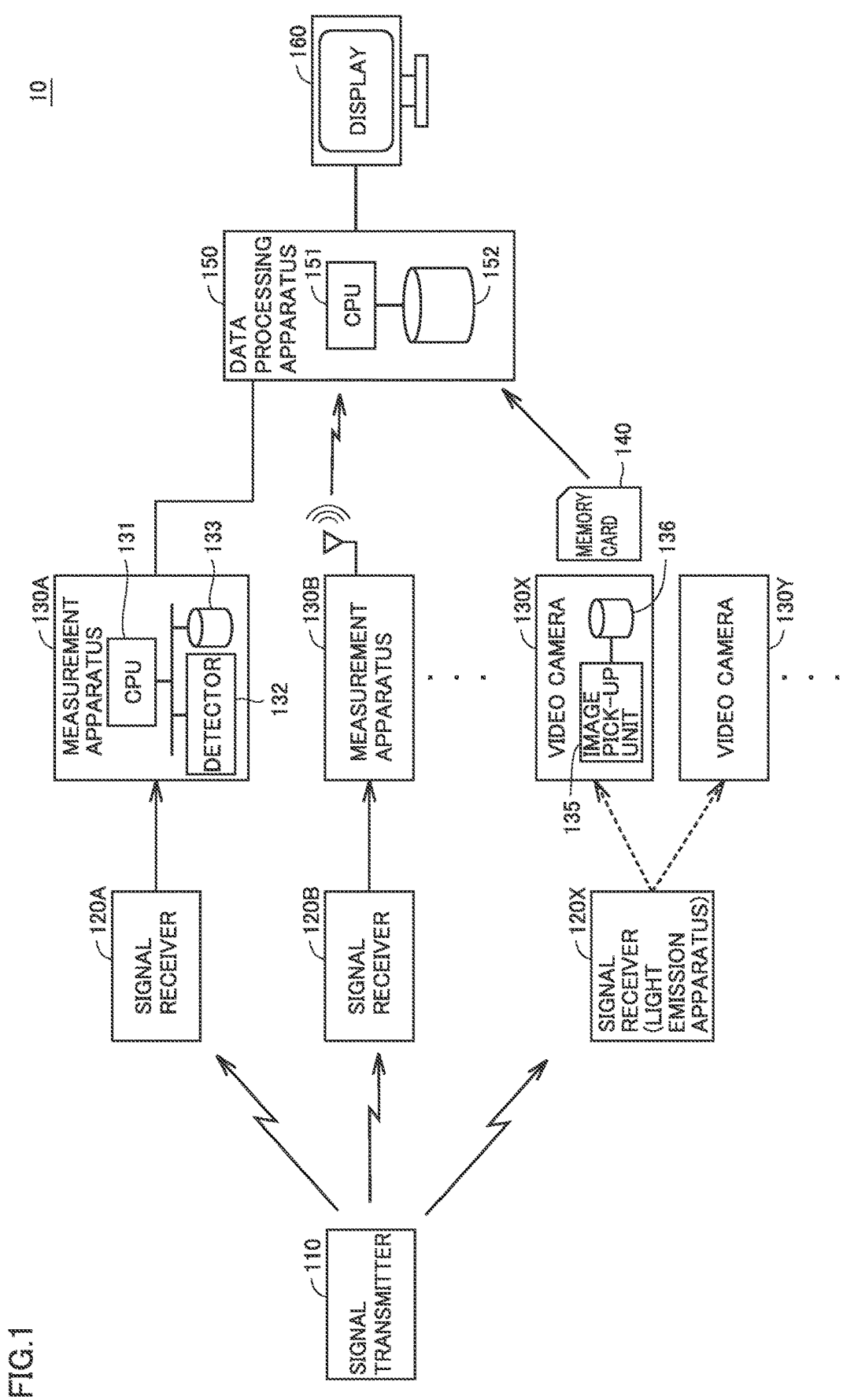
FIG. 1 is an overall block diagram of a data measurement system according to an embodiment.

An embodiment of the present invention will be described in detail below with reference to the drawings. The same or corresponding elements in the drawings have the same reference characters allotted and description thereof will not be repeated.

[Configuration of Data Measurement System]

FIG. 1 is an overall block diagram of a data measurement system 10 according to an embodiment. Referring to FIG. 1, data measurement system 10 includes a signal transmitter 110, a plurality of signal receivers 120A, 120B, and 120X (which will also comprehensively be referred to as a "signal receiver 120" below), measurement apparatuses 130A and 130B, video cameras 130X and 130Y, a data processing apparatus 150, and a display 160. In the description below, measurement apparatuses 130A and 130B and video cameras 130X and 130Y will also comprehensively be referred to as a "measurement apparatus 130." Data measurement system 10 shows measurement data including image data obtained from a plurality of measurement apparatuses 130, as being in synchronization on a time-series basis. The data measurement system is used, for example, for observing and analyzing association between an event experienced by a subject or an object to be observed, and status change that occurs in the subject or the object caused by the event.

Signal transmitter 110 transmits a trigger signal to be used for synchronization between measurement data sets from the plurality of measurement apparatuses 130. Signal transmitter 110 simultaneously transmits (broadcasts) a pulsed trigger signal, for example, through wireless communication and/or wired communication. In the present embodiment, the trigger signal is not an activation signal and a measurement start signal for each measurement apparatus, but a signal for specifying a subject measurement period in each measurement apparatus. The trigger signal is transmitted at the time of start and end of the subject measurement period. Basically, the trigger signal is issued while each measurement apparatus 130 is active and is conducting measurement. The trigger signal is not necessarily limited to a pulsed signal, but may be a signal having a specific pattern such as a sinusoidal wave or a packet signal containing ID data for identification.

Signal receiver 120 is configured to receive the trigger signal transmitted from signal transmitter 110. In response to reception of the trigger signal, signal receiver 120 transmits a marker signal corresponding to the trigger signal to measurement apparatus 130.

In the example in FIG. 1, signal receiver 120A is connected to measurement apparatus 130A and signal receiver 120B is connected to measurement apparatus 130B. In this case, signal receivers 120A and 120B transmit the received trigger signals to measurement apparatuses 130A and 130B, respectively. When the trigger signal is a pulsed signal, signal receiver 120 transfers the received trigger signal as it is to measurement apparatus 130. When the trigger signal is a signal in a form other than the pulsed signal, signal receiver 120 converts the trigger signal into a pulsed signal and transmits the pulsed signal to measurement apparatus 130.

The signal receiver does not have to individually be arranged for each measurement apparatus but a signal from a single signal receiver may be transmitted to two or more measurement apparatuses. As will be described later, in measurement apparatuses 130A and 130B, signals transmitted from signal receivers 120A and 120B are stored in respective storage devices 133 together with measurement data on a time-series basis.

Signal receiver 120X is a light emission apparatus and includes a light emitter (not shown) such as an LED. Signal receiver 120X turns on or off the light emitter in response to reception of the trigger signal. When the measurement apparatus is the video camera, a pulsed signal as above cannot be stored as a signal independent of image data. By arranging signal receiver 120X within a field of view of the video camera, change (turn-on/turn-off) of the light emitter is recorded in successive image frames. Therefore, measurement data can be synchronized based on timing of change of the light emitter.

Measurement apparatuses 130A and 130B are each, for example, an environmental sensor that detects a state of an environment where a subject or an object is located, such as an air temperature, an air pressure, a humidity, and noise and/or a biological sensor that detects a state of a subject such as a body temperature, pulses, respiration, a heart rate, brain waves, a line of sight, brain blood flow, and an acceleration. Each of measurement apparatuses 130A and 130B includes a CPU (central processing unit) 131, a detector 132, and storage device 133. CPU 131 is a control device that controls measurement apparatus 130 in a centralized manner. In each of measurement apparatuses 130A and 130B, data detected by detector 132 is stored in storage device 133. In measurement apparatuses 130A and 130B, the marker signals transmitted from signal receivers 120A and 120B are stored in storage devices 133 together with measurement data, respectively.

Measurement apparatuses 130A and 130B can communicate with data processing apparatus 150. In the example in FIG. 1, measurement apparatus 130A transmits the stored measurement data and marker signal to data processing apparatus 150 through wired communication. Measurement apparatus 130B transmits the measurement data and the marker signal to data processing apparatus 150 through wireless communication.

Video cameras 130X and 130Y each include an image pick-up unit (image sensor) 135 and a storage device 136. Each of video cameras 130X and 130Y causes storage device 136 to store image data of operations of the subject or the object to be observed obtained by image pick-up unit 135. Video cameras 130X and 130Y each obtain, for example, images of working scenes of the subject shot from a plurality of angles, images of facial expressions of the subject, and images of change of a pupil of the subject.

Image data stored in storage device 136 is taken out to a removable external storage medium 140 such as a memory card, and read into data processing apparatus 150. The measurement data may be transferred from the video camera to data processing apparatus 150 through wired communication or wireless communication as in measurement apparatuses 130A and 130B described above.

Each measurement apparatus 130 is provided with storage device 133 or 136 therein. Means for signal transmission between detector 132 and image pick-up unit 135 that obtain data and respective storage devices 133 and 136 is implemented by wired communication. In wireless data transmission, possibility of data missing becomes higher. Therefore, by transmitting data through a wire between a data obtaining unit and the storage device, data loss of the measurement data and the marker signal can be suppressed.

Data processing apparatus 150 includes a CPU 151 and a storage device 152. Data processing apparatus 150 obtains measurement data from each measurement apparatus 130 through communication or an external storage medium. Data processing apparatus 150 performs synchronization processing such that periods during which measurement data sets are obtained match with each other based on the marker signals transmitted together with the measurement data sets. Data processing apparatus 150 causes display 160 to show processed measurement data. A user of data measurement system 10 can use data shown on display 160 to analyze how the state of the subject changes with the occurred event.

Though FIG. 1 shows signal receiver 120 as a device independent of measurement apparatus 130, measurement apparatus 130 may include a function of signal receiver 120. When measurement apparatus 130 is a dedicated device adapted to the system in the present embodiment, the signal receiver and the measurement apparatus are more preferably configured as being integrated with each other. A general-purpose measurement apparatus, on the other hand, could readily be applied to the present system by employing a separate signal receiver.

Any measurement apparatus 130 may include a function of signal transmitter 110. In this case, by performing an operation to start (quit) measurement in the measurement apparatus including the function of the signal transmitter, measurement in another measurement apparatus and storage of data therein can be started (quitted) in response thereto.

In order to synchronize measurement data sets obtained by a plurality of measurement apparatuses on a time-series basis as such, for example, a time stamp based on a time counting function of each measurement apparatus may be referred to and the obtained measurement data may be synchronized based on identicalness of time indicated by the time stamps. In this case, all measurement apparatuses rarely match in time with each other, and not little offset of time from actual time may be caused in the measurement apparatuses.

In addition, regarding also a clock frequency of a clock signal for a time counting function of each measurement apparatus, there may be not little error in clock frequency of an oscillator for generating a clock signal. Therefore, even when there is no offset of start time between measurement apparatuses, time indicated by the same clock number may be different for each measurement apparatus. Then, even when the measurement apparatuses match in start time with each other, in particular as a measurement period is longer, deviation in time between measurement data sets may become larger and a degree of association (accuracy in synchronization) between data sets may lower.

In data measurement system 10 according to the present embodiment, each measurement apparatus adopts an approach to storage of the marker signal based on the trigger signal simultaneously transmitted from signal transmitter 110 together with measurement data and synchronization between measurement data sets based on the marker signal (start signal) at the time of start of the subject measurement period and the marker signal at the time of end (end signal) in data processing apparatus 150. According to such a configuration, even though there is an error in time stamp or clock cycle between measurement apparatuses, a difference in relative time between two marker signals recognized in each measurement apparatus is at least equal to or shorter than one control cycle in each measurement apparatus. Therefore, accuracy in synchronization between data sets within the subject measurement period can be enhanced by synchronization processing as in the present embodiment.

[Description of Synchronization Processing]

Figure 2:
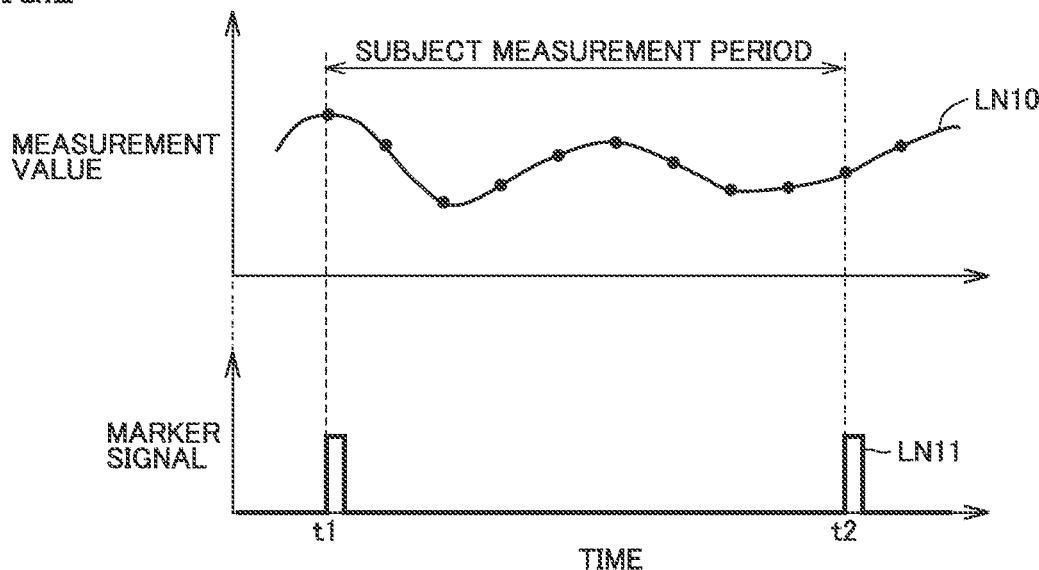
FIG. 2 is a diagram for illustrating relation between measurement data and a marker signal in a measurement apparatus.

FIG. 2 is a diagram for illustrating relation between measurement data and a marker signal in measurement apparatus 130. An upper tier in FIG. 2 shows a measurement value detected by detector 132 and a lower tier shows a marker signal.

Referring to FIG. 2, at time t1, the marker signal at the time of start is received, and at time t2, the marker signal at the time of end is received (a line LN11). In other words, the subject measurement period is a period between time t1 and time t2. In measurement apparatus 130, measurement data that changes as shown with a line LN10 is sampled at a prescribed sampling rate and stored in storage device 133. At this time, the measurement data and the marker signal are stored in association with the time stamp (time) owing to the time counting function in the device.

Figure 3:
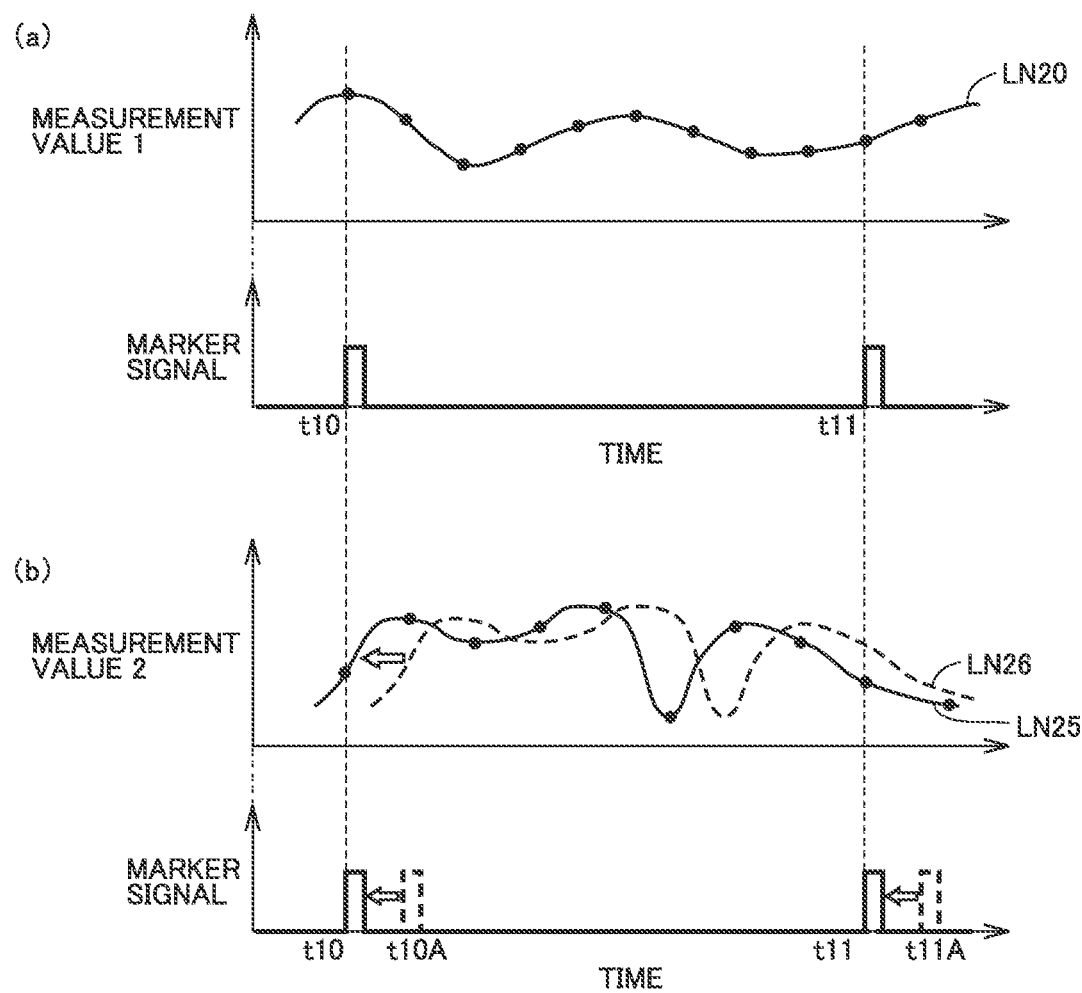
FIG. 3 is a diagram for illustrating relation between each measurement data set and a marker signal in an example where a plurality of measurement apparatuses are provided.

FIG. 3 is a diagram for illustrating relation between each measurement data set and a marker signal in an example where a plurality of measurement apparatuses are provided. For example, FIG. 3 (*a*) shows data in measurement apparatus 130A in FIG. 1 and FIG. 3 (*b*) shows data in measurement apparatus 130B in FIG. 1. In the example in FIG. 3, in the time stamp in measurement apparatus 130A, the subject measurement period starts at t10 and ends at t11. In the time stamp in measurement apparatus 130B, the subject measurement period starts at t10A (≠t10) and ends at t11A (≠t11). A duration of the subject measurement period is the same, that is, a duration of a period from time t10 to time t11 is the same as a duration of a period from time t10A to time t11A.

In an example where the measurement apparatuses are thus different from each other in time stamp, even when times indicated in the time stamps of the measurement apparatuses are caused to match with each other, relationship between a measurement value 1 (a solid line LN20 in FIG. 3) of measurement apparatus 130A and a measurement value 2 (a dashed line LN26 in FIG. 3) of measurement apparatus 130B is not correct. In synchronization processing in the present embodiment, start timings determined by marker signals at the time of start are aligned with each other and end timings determined by marker signals at the time of end are aligned with each other (a solid line LN25 in FIG. 3). Accuracy in synchronization of measurement data within the subject measurement period can thus be enhanced.

Figure 4:
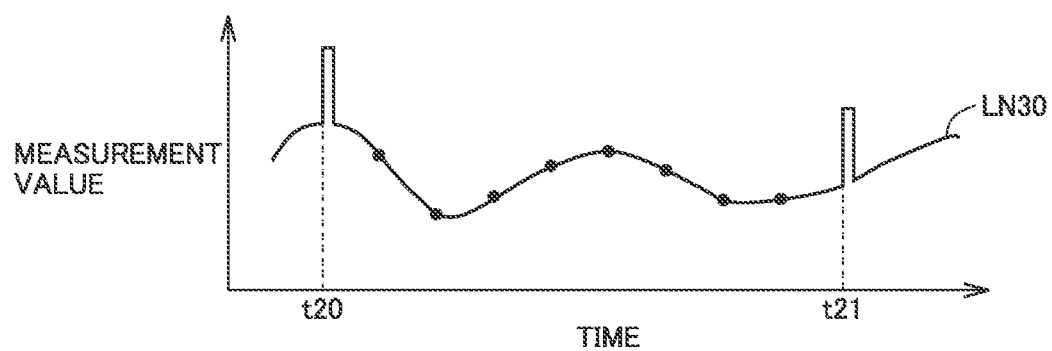
FIG. 4 is a diagram showing an exemplary waveform when a marker signal is superimposed on measurement data.

Though an example in which measurement apparatus 130 is configured such that a marker signal from signal receiver 120 can be stored through an individual channel different from a channel for measurement data is described with reference to FIGS. 2 and 3, specifications of some measurement apparatuses 130 may not allow input of an external signal. In such a case, as shown with a line LN30 in FIG. 4, the marker signal may be superimposed on measurement data such that start/end timing of the subject measurement period is stored.

Synchronization processing in an example where video camera 130X serves as the measurement apparatus will now be described with reference to FIG. 5. In the case of the video camera, generally, the marker signal cannot be stored through another channel as in FIG. 2. Therefore, signal receiver 120X with a light emission function is arranged within a range of image pick-up by the camera as described above and synchronization processing is performed based on a state of light emission by signal receiver 120X.

Figure 5:
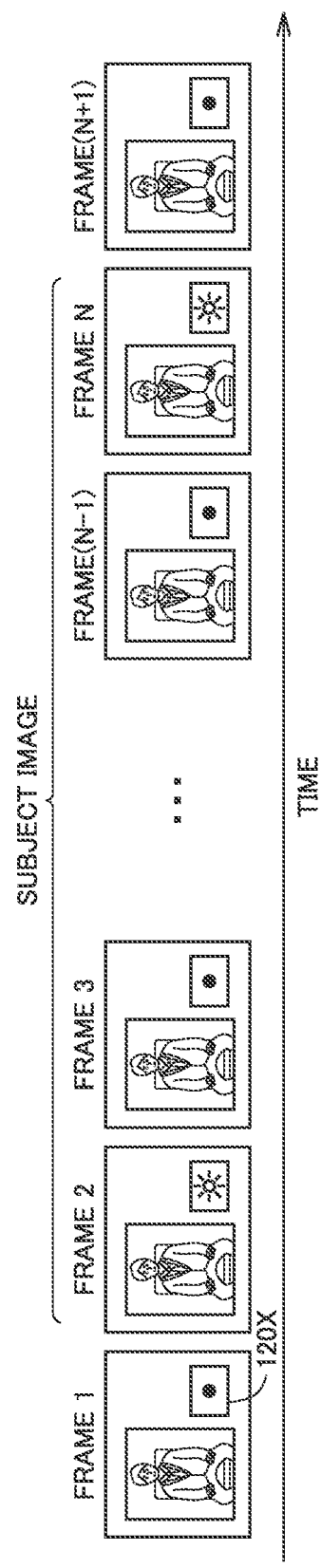
FIG. 5 is a diagram for illustrating a marker signal in a camera image.

Referring to FIG. 5, generally, in the video camera, moving images are recorded as a series of still images shot successively at a prescribed frame rate. FIG. 5 shows images from a frame 1 to a frame (N+1) on a time-series basis. In each recorded image, signal receiver 120X is arranged within the range of image pick-up and the state of light emission by the light emitter of signal receiver 120X can be recognized therein.

In the example in FIG. 5, signal receiver 120X is emitting light in a frame 2 and a frame N. In other words, a start trigger signal is received at time when frame 2 is shot and an end trigger signal is received at time when frame N is shot. Therefore, a period from frame 2 to frame N is the subject measurement period. Then, in data processing apparatus 150, frame 2 is linked to the start signal of another measurement apparatus (for example, time t10 in FIG. 3) and frame N is linked to the end signal (time t11 in FIG. 3). Image data (frame 2 to frame N) within the subject measurement period obtained by video camera 130X can thus be synchronized with measurement data from measurement apparatus 130A.

Though the example in FIG. 5 is configured to recognize the trigger signal based on a light emitting state of the light emitter within the image, audio data can also be recorded together with image data in the video camera and hence the trigger signal may be recognized based on an audio signal. In this case, a signal receiver capable of outputting a specific audio signal such as a beep sound is employed to output the audio signal in response to reception of the trigger signal. Then, based on the timing when the audio signal is recorded in the audio data, determination as to start and end of the subject measurement period is made in data processing apparatus 150 for synchronization with another measurement data set. Synchronization processing may thus be performed with the use of the audio signal. Such synchronization processing with the use of the state of the light emitter and/or recording of the audio signal in the video camera also corresponds to superimposition of the marker signal (the state of the light emitter and the audio signal) on measurement data (image data).

[Explanation of Trigger Signal]

In wireless communication of a trigger signal from signal transmitter 110, depending on a condition of communication between signal transmitter 110 and signal receiver 120, signal receiver 120 may not be able to correctly receive the trigger signal.

In the data measurement system according to the embodiment, as set forth above, in order to detect a biological signal of a subject, measurement apparatus 130 may be attached to the body of the subject. When signal receiver 120 is arranged in the inside or in the vicinity of measurement apparatus 130, signal receiver 120 is also arranged as being in contact with the subject's body.

Radio waves in conformity with Bluetooth® or Wi-Fi (2.4 GHz band and 5 GHz band) are generally used for wireless communication, and those radio waves at a high frequency have such a characteristic as being readily absorbed by moisture. Approximately sixty percent of the human body is composed of moisture. Therefore, for example, as the subject moves and the subject's body is located between signal transmitter 110 and signal receiver 120, radio waves from signal transmitter 110 are absorbed while they pass through the body and signal receiver 120 may be unable to correctly receive the trigger signal.

Figure 6:
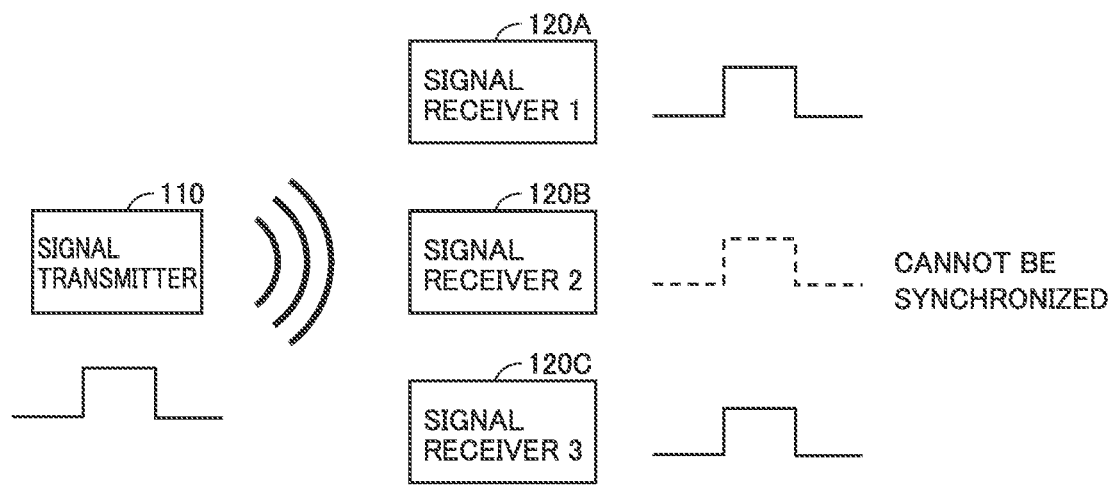
FIG. 6 is a diagram for illustrating a trigger signal in a comparative example.

In an example where signal transmitter 110 transmits a single pulsed signal as the trigger signal as in a comparative example in FIG. 6, for example, when signal receiver 120B is unable to receive the trigger signal, a marker signal from signal receiver 120B is not stored in measurement apparatus 130B. Consequently, measurement data from measurement apparatus 130B cannot be synchronized with measurement data from another measurement apparatus.

In the data measurement system according to the present embodiment, a configuration in which signal transmitter 110 outputs as a trigger signal, a signal (group of pulses) including a plurality of pulsed signals successively transmitted at prescribed intervals is adopted. In data processing apparatus 150, measurement data sets from the plurality of measurement apparatuses are synchronized on the time-series basis based on start/end synchronization timing determined by the received pulsed signals. According to such a configuration, even if reception of some pulsed signals included in the trigger signal fails, synchronization with measurement data from another measurement apparatus can be achieved so long as at least one pulsed signal is successfully received.

Figure 7:
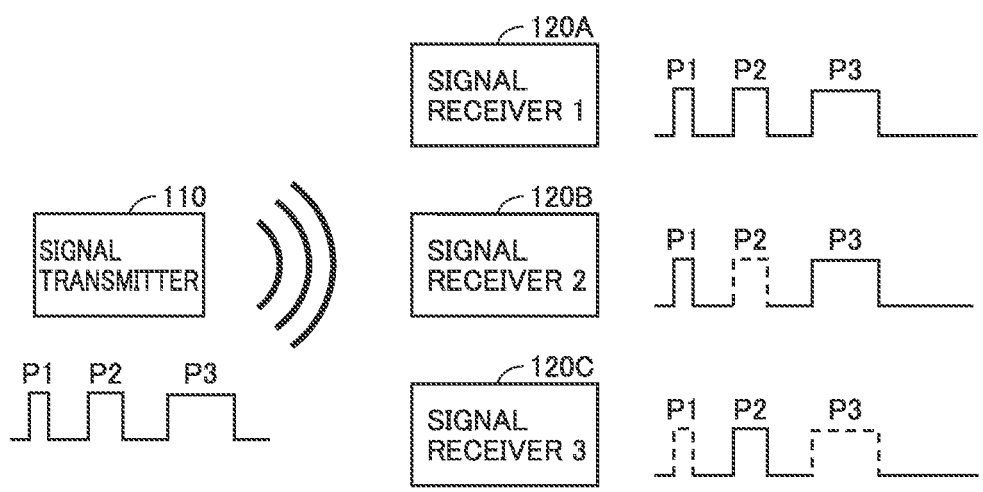
FIG. 7 is a diagram for illustrating a trigger signal in the data measurement system in the embodiment.

FIG. 7 is a diagram for illustrating a trigger signal in the data measurement system in the present embodiment. In the example in FIG. 7, signal transmitter 110 outputs as the trigger signal, a group of pulses including three pulsed signals P1 to P3 successively transmitted at prescribed intervals (for example, 100 ms). Pulsed signals P1 to P3 are different from one another in pulse width. For example, pulsed signal P1 has a pulse width of 50 ms, pulsed signal P2 has a pulse width of 100 ms, and pulsed signal P3 has a pulse width of 200 ms. The trigger signal should only include at least two pulsed signals, and may include four or more pulsed signals. The pulse width of each pulsed signal and intervals between the pulsed signals may be different from those in the example above.

As shown in FIG. 7, an example in which signal receiver 120A receives all pulsed signals P1 to P3 whereas signal receiver 120B does not receive a pulsed signal P2 and signal receiver 120C does not receive pulsed signals P1 and P3 is considered. In this case, among pulsed signals P1 to P3, there is no pulsed signal received in common among signal receivers 120A to 120C. Therefore, with an approach to alignment of time of received pulsed signals, synchronization of measurement data sets cannot be achieved.

Figure 8:
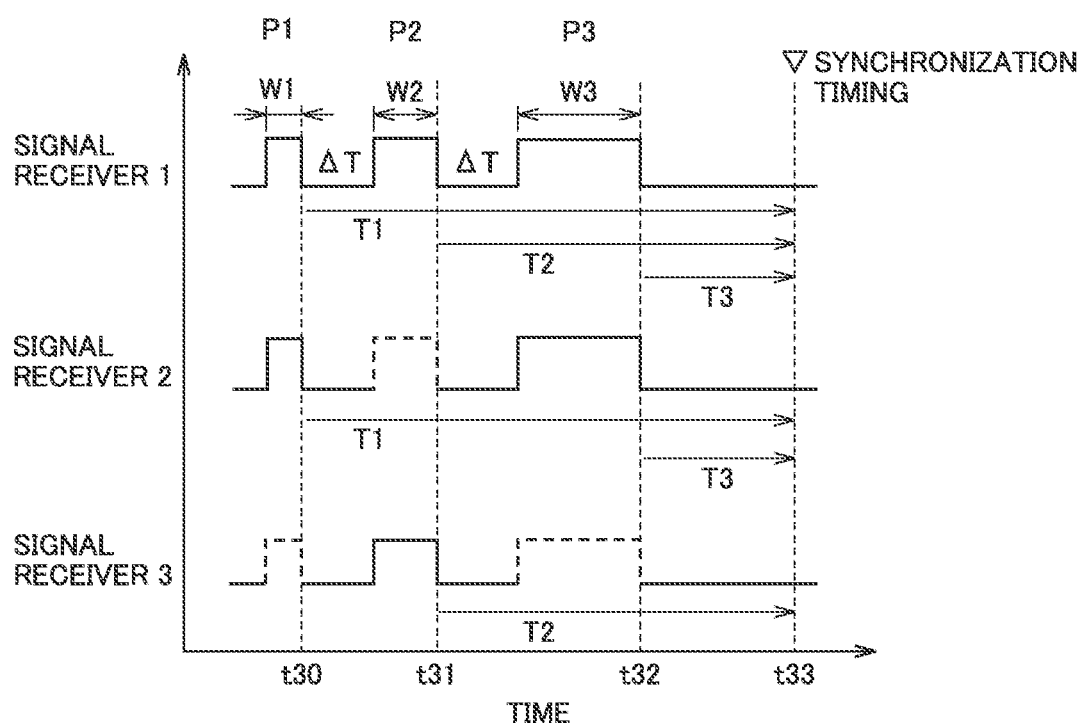
FIG. 8 is a diagram for illustrating relation between a trigger signal and synchronization timing in the data measurement system in the embodiment.

FIG. 8 is a diagram for illustrating relation between a trigger signal and synchronization timing in the present embodiment. In the present embodiment, in data processing apparatus 150, time after lapse of a prescribed time period since each pulsed signal in the trigger signal is set as timing of synchronization of start or end of measurement data. Specifically, when data processing apparatus 150 receives pulsed signal P1, it sets timing (time t33 in FIG. 8) after lapse of a prescribed time period T1 since fall (time t30 in FIG. 8) of pulsed signal P1 as synchronization timing. When data processing apparatus 150 receives pulsed signal P2, it sets timing (time t33 in FIG. 8) after lapse of a prescribed time period T2 since fall (time t31 in FIG. 8) of pulsed signal P2 as synchronization timing. When data processing apparatus 150 receives pulsed signal P3, it sets timing (time t33 in FIG. 8) after lapse of a prescribed time period T3 since fall (time t32 in FIG. 8) of pulsed signal P3 as synchronization timing. Which of pulsed signals P1 to P3 has been received can be determined based on pulse widths W1 to W3 of the received pulsed signals.

In an example where pulse widths W1 to W3 of the pulsed signals and an interval $\Delta T$ between adjacent pulsed signals are determined in advance, prescribed time periods T1 to T3 are determined such that synchronization timings are aligned with each other, whichever of pulsed signals P1 to P3 may be received. More specifically, as prescribed time period T3 from pulsed signal P3 is determined, prescribed time period T2 from pulsed signal P2 can be determined as in an expression (1).

$$T2=T3+W3+\Delta T \quad (1)$$

Prescribed time period T1 from pulsed signal P1 can be determined as in an expression (2).

$$T1=T2+W2+\Delta T=T3+W2+W3+2\Delta T \quad (2)$$

In an example where the trigger signals received by signal receivers 120A to 120C are in states as shown in FIG. 7, data processing apparatus 150 determines, based on a signal received by signal receiver 120A, synchronization timing from each of pulsed signals P1 to P3 as in FIG. 8. Data processing apparatus 150 determines, based on a signal received by signal receiver 120B, synchronization timing from pulsed signals P1 and P3. Furthermore, data processing apparatus 150 determines, based on a signal received by signal receiver 120C, synchronization timing from pulsed signal P2.

Thus, with the use of a plurality of pulsed signals different in pulse width from one another as the trigger signal, so long as each signal receiver 120 is able to receive at least one pulsed signal in the trigger signal, measurement data from the measurement apparatus associated with that signal receiver can be synchronized with measurement data from another measurement apparatus associated with another signal receiver. Therefore, obtained measurement data sets can more reliably be synchronized on the time-series basis.

For example, if a ratio of poor reception for each pulse is assumed as 5%, by application of the approach in the present embodiment using three pulsed signals as in FIG. 7, the ratio of poor reception can be lowered to 0.0125%.

Though an example in which timing for aligning measurement data sets to be presented to a user is determined through signal processing in data processing apparatus 150 is described above, the synchronization timing as described above may be used as timing of start/end of measurement in each measurement apparatus. In this case, since measurement data sets transmitted from measurement apparatuses to data processing apparatus 150 are data sets synchronized in start time and end time, determination as to synchronization timing in data processing apparatus 150 does not have to be made and obtained measurement data should only be shown as it is.

Though the example above is configured to distinguish between pulsed signals included in a group of pulses in a trigger signal based on varied pulse widths of the pulsed signals, instead of the pulse width, an amplitude or a duty ratio of the pulse may be varied. When a harmonic is superimposed on the trigger signal, a frequency of the signal to be superimposed may be varied. Alternatively, radio waves at a plurality of frequencies may be employed as the trigger signal.

[Control in Data Measurement System]

Figure 9:
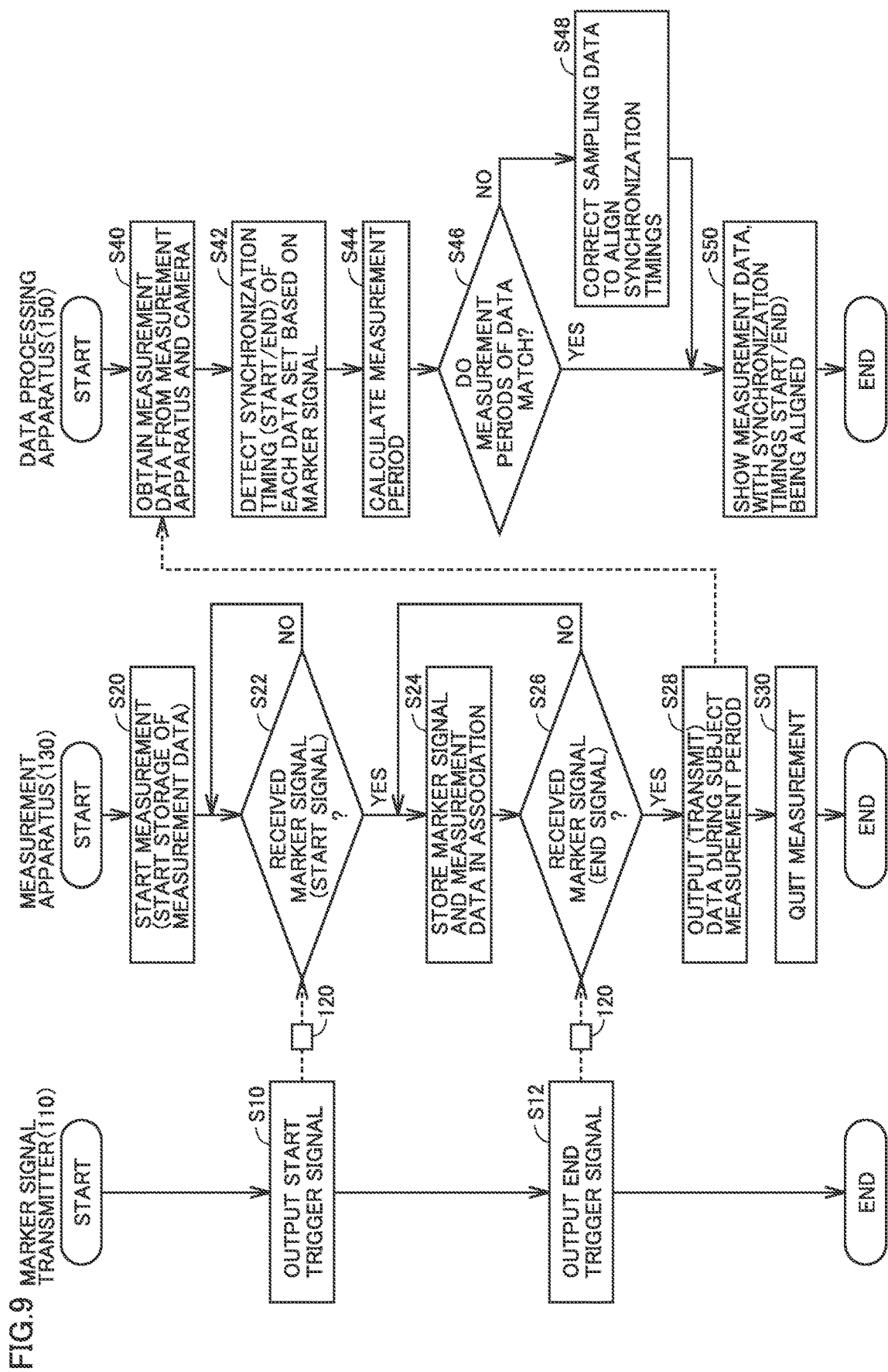
FIG. 9 is a flowchart for illustrating processing in each device in the data measurement system.

FIG. 9 is a flowchart for illustrating processing in each device in the data measurement system according to the present embodiment.

Referring to FIG. 9, in a step (the step being abbreviated as S below) 10, at timing of an operation by a user or at prescribed timing registered in advance in signal transmitter 110, signal transmitter 10 broadcasts the trigger signal indicating timing of start (start trigger signal: first group of pulses) of the subject measurement period.

Signal transmitter 110 broadcasts the trigger signal indicating timing of end (end trigger signal: second group of pulses) of the subject measurement period at timing of an operation by the user or the timing when a predetermined period has elapsed since issuance of the start signal (S12).

In measurement apparatus 130, in S20, in response to the operation by the user, measurement processing is started and storage of measurement data in storage device 133 is started. Though measurement processing in measurement apparatus 130 is preferably started prior to reception of the marker signal from signal receiver 120, it may be started in response to reception of the marker signal in S22 or measurement start timing determined by the marker signal.

In S22, measurement apparatus 130 determines whether or not it has received the marker signal (start signal) transmitted from signal receiver 120 in response to the trigger signal (the first group of pulses) from signal transmitter 110. When measurement apparatus 130 has not received the marker signal (start signal) (NO in S22), the process returns to S22 and measurement apparatus 130 waits for reception of the marker signal while it continues measurement processing.

When measurement apparatus 130 has received the marker signal (start signal) (YES in S22), the process proceeds to S24 and measurement apparatus 130 causes storage device 133 to store the received marker signal in association with measurement data. Then, in S26, measurement apparatus 130 determines whether or not it has received the marker signal indicating end (end signal) of measurement from signal receiver 120 in response to the trigger signal (the second group of pulses) from signal transmitter 110. When measurement apparatus 130 has not received the marker signal (end signal) from signal receiver 120 (NO in S26), the process returns to S24 and measurement apparatus 130 continues storage of measurement data at a prescribed sampling rate.

When measurement apparatus 130 has received the marker signal (end signal) from signal receiver 120 (YES in S26), the process proceeds to S28 and measurement apparatus 130 outputs measurement data and the data on the marker signal during the subject measurement period from the start signal until the end signal to data processing apparatus 150. Thereafter, measurement apparatus 130 stops measurement processing in response to an operation by the user or the like (S30).

When data stored in measurement apparatus 130 is read into data processing apparatus 150 by means of an external storage device, step S28 is skipped. When video camera 130X or 130Y serves as the measurement apparatus, the marker signal is recorded as a light emission signal in image data and hence determination as to reception of the marker signal as in S22 and S26 may not be made. In such a case, the entire image data during the measurement period is read into data processing apparatus 150 and synchronization processing is performed in data processing apparatus 150 automatically or in response to an operation by the user.

When measurement processing is performed over a long period, influence by the difference in sampling rate between measurement apparatuses 130 increases with measurement time. In such a case, data within the entire measurement period is divided into data for a shorter period and the shorter data is transmitted to data processing apparatus 150 so that influence by the difference in sampling rate is preferably lessened. In this case, in measurement apparatus 130, in parallel to transmission of the measurement data to data processing apparatus 150 in S28 in FIG. 9, storage of the measurement data and the marker signal in S24 is continued. Each time the marker signal is transmitted from signal receiver 120, the measurement data and the data on the marker signal stored after previous reception of the marker signal are transmitted to data processing apparatus 150.

By thus dividing measurement data and transmitting divided data to data processing apparatus 150 for processing, synchronization processing for measurement data from measurement apparatuses 130 is performed in a unit of a block of transmitted measurement data. Therefore, even in the case of measurement over a long period, accuracy in synchronization of data can be maintained.

Processing in data processing apparatus 150 will now be described. In S40, data processing apparatus 150 obtains measurement data and image data from measurement apparatus 130. In S42, data processing apparatus 150 detects synchronization timing indicating start and end of measurement as described with reference to FIG. 8, based on a pulsed signal included in the marker signal included in each obtained data set.

In S44, data processing apparatus 150 calculates a measurement period between adjacent marker signals based on the detected synchronization timing. In S46, data processing apparatus 150 determines whether or not durations of measurement periods calculated for measurement data from measurement apparatuses 130 match with each other.

When the durations of the measurement periods of measurement apparatuses 130 match with each other (YES in S46), the process proceeds to S50. Data processing apparatus 150 aligns start timings of measurement data sets from measurement apparatuses 130 with each other and aligns end timings thereof with each other, and has measurement data shown on display 160. With the representation, the user analyzes operations of the subject.

When there is a measurement apparatus different in duration of the measurement period (NO in S46), the process proceeds to S48. Data processing apparatus 150 performs processing for correcting time for sampling of measurement data such that the durations of the measurement periods match with each other. Thereafter, the process proceeds to S50, and measurement data sets are shown on display 160 as being in synchronization.

As each device is controlled in accordance with processing as above, in the data measurement system including a plurality of measurement apparatuses, measured data can be presented as being appropriately synchronized with each other. Accuracy in synchronization between a plurality of measurement data sets can thus be improved and accuracy in analysis of cause-and-effect relation thereof can be improved.

[Modification]

An example in which each signal receiver 120 normally receives at least one in a group of pulses transmitted from signal transmitter 110 is described in the embodiment above. If a signal receiver 120 normally receives none of pulsed signals in the embodiment above, normal operations of the data measurement system are not ensured.

In a modification which will be described below, a configuration for transmitting again a trigger signal (group of pulses) in the event that there is a signal receiver 120 that receives none of pulsed signals will be described.

(First Modification)

Figure 10:
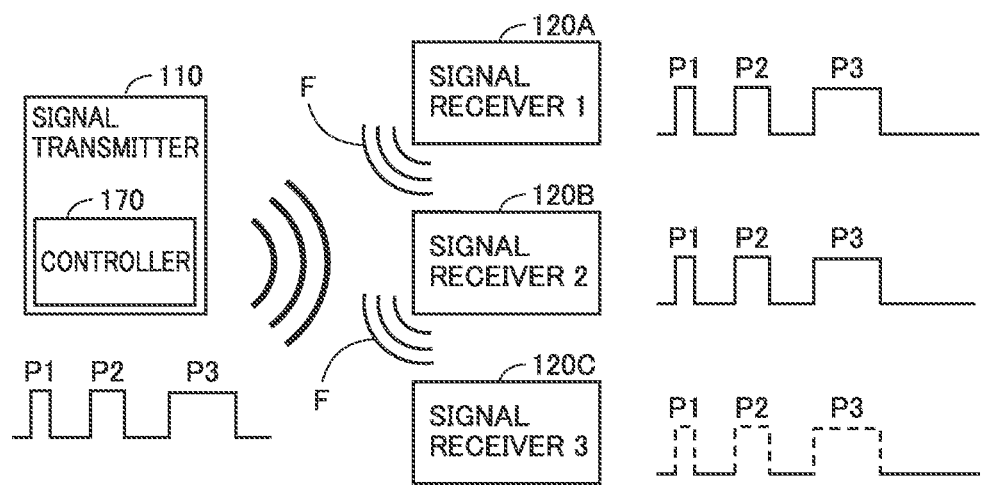
FIG. 10 is a diagram showing a data measurement system in a first modification.

FIG. 10 is a diagram showing a data measurement system in a first modification. In the first modification, signal transmitter 110 further includes a controller 170.

In the first modification, each of signal receivers 120A to 120C determines whether or not it has received at least one of pulsed signals P1 to P3. When each of signal receivers 120A to 120C receives at least one of pulsed signals P1 to P3, it transmits a feedback signal (F in FIG. 10) to signal transmitter 110.

After pulsed signals P1 to P3 are transmitted, controller 170 determines whether or not it has received a feedback signal from each of signal receivers 120A to 120C within a prescribed time period. When controller 170 does not receive the feedback signal from at least one of signal receivers 120A to 120C, it controls signal transmitter 110 to transmit again pulsed signals P1 to P3.

In the example in FIG. 10, signal receivers 120A and 120B determine that they have received at least one of pulsed signals P1 to P3 and transmit the feedback signals to signal transmitter 110. Since signal receiver 120C has received none of pulsed signals P1 to P3, on the other hand, it does not transmit the feedback signal to signal transmitter 110.

Controller 170 of signal transmitter 110 senses that it has not received the feedback signal from signal transmitter 120C within the prescribed time period after transmission of the trigger signal. In this case, controller 170 instructs signal transmitter 110 to transmit again the trigger signal.

The feedback signal may be transmitted wirelessly as in FIG. 10 or through a wire (not shown).

Controller 170 may be an independent control device provided outside signal transmitter 110. In that case, controller 170 communicates with signal transmitter 110 wirelessly or through a wire.

According to such a configuration, a state that any signal receiver 120 has failed to receive pulsed signals P1 to P3 in spite of transmission of the trigger signal from signal transmitter 110 can be sensed. When failure in reception by signal receiver 120 is sensed, the trigger signal can be transmitted again from signal transmitter 110. Therefore, the trigger signal can reliably be transmitted to each signal receiver 120. In other words, data can appropriately be synchronized in data processing apparatus 150.

(Second Modification)

A user may manually sense presence of signal receiver 120C that receives none of pulsed signals and may have the trigger signal in the first modification again transmitted.

Figure 11:
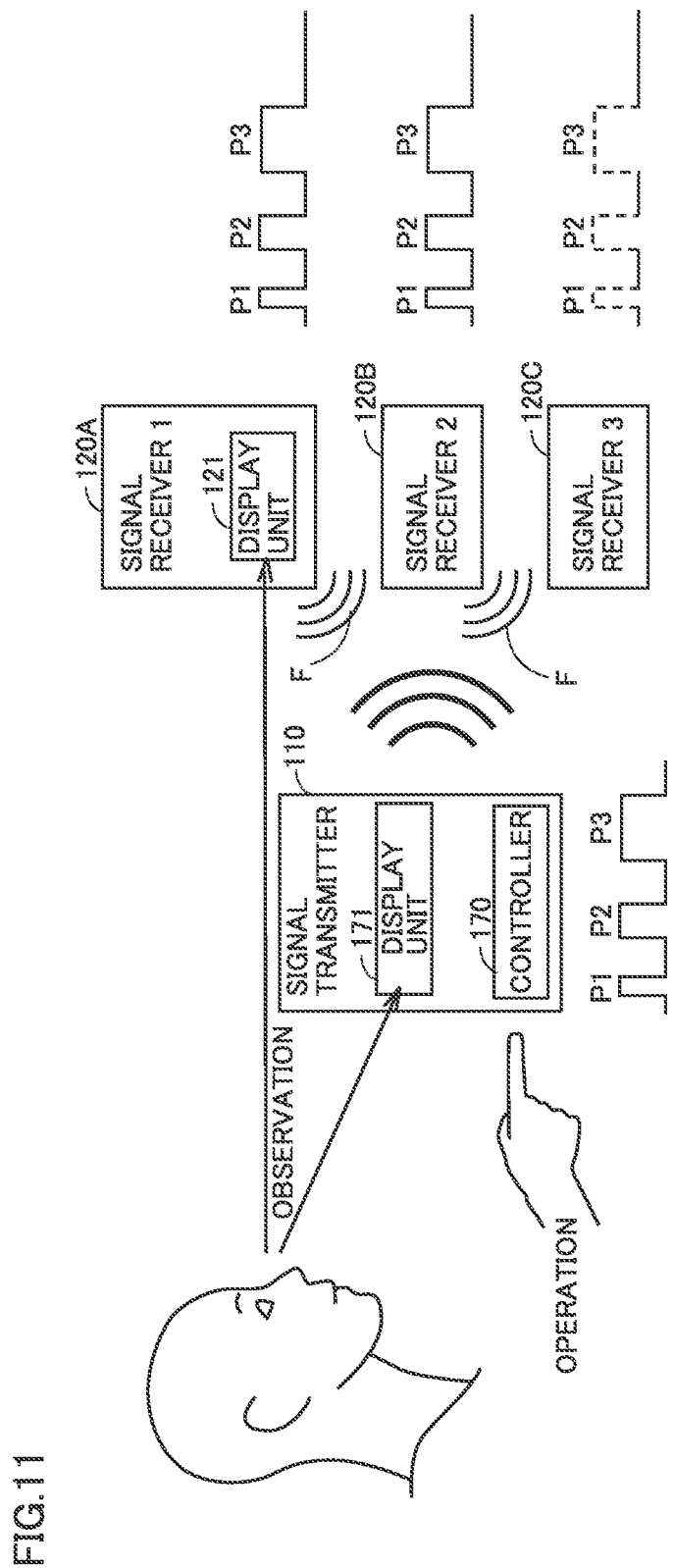
FIG. 11 is a diagram showing a data measurement system in a second modification.

FIG. 11 is a diagram showing a data measurement system in a second modification. In the second modification, signal transmitter 110 further includes a display unit 171 in addition to controller 170 described in the first modification. Each signal receiver 120 further includes a display unit 121. FIG. 11 does not show display unit 121 in signal receivers 120B and 120C.

In the second modification, for example, when each signal receiver 120 receives at least one of pulsed signals, information indicating completion of reception is shown on display unit 121 of signal receiver 120. As the user visually recognizes display unit 121, the user recognizes presence of signal receiver 120 that has not transmitted the feedback signal and inputs an instruction for transmission again of the trigger signal by operating a not-shown operation portion of signal transmitter 110. As controller 170 senses the input from the user, it controls signal transmitter 110 to transmit again the trigger signal.

Display unit 121 may be implemented by a display independently provided outside each signal receiver 120. In that case, display unit 121 communicates with each of signal receivers 120 wirelessly or through a wire.

Display unit 121 may be implemented by a display provided in common to a plurality of signal receivers 120. In that case, the display unit is configured to show information indicating completion of reception by the plurality of signal receivers 120. Thus, the user can check a state of reception by the plurality of signal receivers 120 simply by viewing a single display unit 121.

In the second modification, each of signal receivers 120 may be configured to transmit a feedback signal to signal transmitter 110 when each of signal receivers 120 receives at least one of pulsed signals as in the first modification. In this case, a condition of reception of the feedback signal in signal transmitter 110 is shown on display unit 171. By viewing display unit 171, the user can recognize presence of signal receiver 120 that has not transmitted the feedback signal. Then, the user inputs an instruction to transmit again the trigger signal by operating a not-shown operation portion of signal transmitter 110. When controller 170 senses the input from the user, it controls signal transmitter 110 to transmit again the trigger signal.

According to such a configuration, the user can visually check the feedback signal and can provide an input for an instruction to issue the trigger signal by signal transmitter 110, which can improve convenience.

Controller 170 and display unit 171 may be implemented by a display independently provided outside signal transmitter 110. In that case, controller 170 and display unit 171 communicate with signal transmitter 110 wirelessly or through a wire.

(Third Modification)

Controller 170 may sense presence of signal receiver 120C that receives none of pulsed signals shown in the first modification.

In the third modification, signal receivers 120A to 120C each transmit a feedback signal (F in FIG. 10) to signal transmitter 110 constantly while power is on.

The feedback signal includes measurement data from measurement apparatuses 130A to 130C and received pulsed signals P1 to P3. In the third modification, each of receivers 120A to 120C does not have to make determination as to reception of pulsed signals P1 to P3.

Controller 170 monitors the feedback signals from signal receivers 120A to 120C and determines whether or not the feedback signals includes pulsed signals P1 to P3. When controller 170 determines that the feedback signals do not include pulsed signals P1 to P3, it instructs signal transmitter 110 to transmit again the trigger signal.

In the first to third modifications, the interval between pulsed signals and/or the width of pulsed signals in the again transmitted trigger signal may be the same as or different from that/those of the previous trigger signal.

Setting as to whether or not to transmit the feedback signal to signal transmitter 110 at the time of reception of the trigger signal may be different for each signal receiver 120. Whether or not to control transmission again of the trigger signal automatically as in FIG. 10 or manually as in FIG. 11 may be different for each signal receiver 120.

Signal receivers 120A and 120B update a previously received trigger signal with a subsequently received trigger signal. For example, regarding the trigger signal indicating start of synchronization, the last trigger signal received at the time when the trigger signal indicating start of synchronization seems to have been inputted is defined as a formal trigger signal indicating start of synchronization. For example, data processing apparatus 150 determines the time when the trigger signal indicating start of synchronization seems to have been inputted. The time when the trigger signal indicating start of synchronization seems to have been inputted is, for example, time corresponding to first half of the entire measurement data.

Regarding the trigger signal indicating end of synchronization, similarly, the last trigger signal received at the time when the trigger signal indicating end of synchronization seems to have been inputted is defined as a formal trigger signal indicating end of synchronization. For example, data processing apparatus 150 determines the time when the trigger signal indicating end of synchronization seems to have been inputted. The time when the trigger signal indicating end of synchronization seems to have been inputted is, for example, time corresponding to latter half of the entire measurement data. The trigger signal may be updated by update of data itself on a memory or by setting for adoption of a latest trigger signal on software.

According to the configuration in the modifications above, whether or not each signal receiver 120 has received the trigger signal can be determined. When there is signal receiver 120 that has not received the trigger signal, signal transmitter 110 can transmit again the trigger signal. Therefore, the trigger signal can reliably be transmitted to each signal receiver 120. Therefore, a plurality of measurement data sets can more reliably be synchronized.

A contrivance in the case of failure in reception of all pulsed signals by the signal receiver is described in the modifications with reference to the example where the trigger signal includes a plurality of pulsed signals. Without being limited as such, however, the contrivance is effective even when the trigger signal is composed of a single pulsed signal.

Though an example in which start timing and end timing are timings after lapse of a prescribed time period since generation of the pulsed signal included in the trigger signal is described above, the start timing and the end timing may each be timing a prescribed time period before generation of the pulsed signal. In other words, the start timing and the end timing are each set as timing distant by a prescribed time period from generation of each pulsed signal in the trigger signal.

[Aspects]

(Clause 1) A data measurement system according to one aspect includes a plurality of measurement apparatuses, a data processing apparatus that processes data sets obtained from the plurality of measurement apparatuses, respectively, and a transmitter that wirelessly transmits a trigger signal associated with data processing to the plurality of measurement apparatuses. The trigger signal includes a first group of pulses indicating start timing of the data processing and a second group of pulses indicating end timing of the data processing. The data processing apparatus obtains the data sets which are measured during a period between the start timing and the end timing, and temporally align the data sets with each other by aligning start timings of the data sets with each other and aligning end timings of the data sets with each other to obtain processed measurement data from the plurality of measurement apparatuses. Each of the first group of pulses and the second group of pulses includes a first pulse and a second pulse successively transmitted at a prescribed interval. The first pulse and the second pulse are different from each other in pulse width. The start timing is timing distant by a first prescribed time period from generation of the first pulse in the first group of pulses or timing distant by a second prescribed time period from generation of the second pulse in the first group of pulses. The end timing is timing distant by the first prescribed time period from generation of the first pulse in the second group of pulses or timing distant by the second prescribed time period from generation of the second pulse in the second group of pulses.

According to the data measurement system described in Clause 1, the trigger signal (the first group of pulses and the second group of pulses) transmitted from the transmitter to each measurement apparatus includes two pulsed signals different from each other in pulse width. So long as each measurement apparatus is able to receive at least one pulsed signal of the two pulsed signals in each of the trigger signal (the first group of pulses) transmitted at start time and the trigger signal (the second group of pulses) transmitted at end time, the data processing apparatus can determine start timing and end timing for synchronization. Imperfect synchronization due to poor reception of the trigger signal in the measurement apparatus can thus be lessened and measurement data can more reliably be synchronized on a time-series basis.

(Clause 2) In the data measurement system described in Clause 1, the first prescribed time period and the second prescribed time period are set such that the timing distant by the first prescribed time period from generation of the first pulse and the timing distant by the second prescribed time period from generation of the second pulse are aligned with each other.

According to the data measurement system described in Clause 2, the first prescribed time period and the second prescribed time period are appropriately set such that start timings are aligned and end timings are aligned based on each pulsed signal. Thus, even when a measurement apparatus fails to receive one of the first pulse and the second pulse, measurement data from that measurement apparatus can be synchronized with measurement data from another measurement apparatus.

(Clause 3) In the data measurement system described in Clause 1 or 2, each of the first group of pulses and the second group of pulses further includes a third pulse different in pulse width from the first pulse and the second pulse. The start timing is the timing distant by the first prescribed time period from generation of the first pulse in the first group of pulses, the timing distant by the second prescribed time period from generation of the second pulse in the first group of pulses, or timing distant by a third prescribed time period from generation of the third pulse in the first group of pulses. The end timing is the timing distant by the first prescribed time period from generation of the first pulse in the second group of pulses, the timing distant by the second prescribed time period from generation of the second pulse in the second group of pulses, or timing distant by the third prescribed time period from generation of the third pulse in the second group of pulses. The first prescribed time period, the second prescribed time period, and the third prescribed time period are set such that the timing distant by the first prescribed time period from generation of the first pulse, the timing distant by the second prescribed time period from generation of the second pulse, and the timing distant by the third prescribed time period from generation of the third pulse are aligned with one another.

According to the data measurement system described in Clause 3, the trigger signal (the first group of pulses and the second group of pulses) transmitted from the transmitter to each measurement apparatus includes three pulsed signals different from one another in pulse width. So long as each measurement apparatus is able to receive at least one pulsed signal of the three pulsed signals in the trigger signal transmitted at each of start time and end time, the data processing apparatus can determine start timing and end timing for synchronization. Since imperfect synchronization due to poor reception of the trigger signal in the measurement apparatus can thus be lessened, processing for synchronization of a plurality of measurement data sets can more reliably be performed.

(Clause 4) In the data measurement system described in any one of Clauses 1 to 3, the transmitter is included in any of the plurality of measurement apparatuses.

According to the data measurement system described in Clause 4, one of the plurality of measurement apparatuses performs a function of the transmitter. Therefore, the system can be constructed without separately preparing the transmitter.

(Clause 5) In the data measurement system described in any one of Clauses 1 to 4, each of the plurality of measurement apparatuses includes any sensor of an environmental sensor that measures environmental information, a biological sensor that measures biological information, and an image sensor for imaging.

According to the data measurement system described in Clause 5, the environmental sensor, the biological sensor, and the image sensor (camera) can be employed as the measurement apparatus.

(Clause 6) In the data measurement system described in Clause 5, each of the plurality of measurement apparatuses includes a storage device where the measurement data measured thereby is stored, and performs means for transmission of a signal from the sensor to the storage device through a wire.

According to the data measurement system described in Clause 6, each measurement apparatus does not use wireless communication as means for signal transmission from the sensor to the storage device. In wireless communication, data may sometimes be lost. Storage of measurement data in the storage device through wired communication can reduce data loss.

(Clause 7) The data measurement system described in any one of Clauses 1 to 6 further includes a display on which the measurement data is presented to a user.

According to the data measurement system described in Clause 7, the user can check measurement data sets from a plurality of measurement apparatuses in association, with the use of the display.

(Clause 8) In the data measurement system described in any one of Clauses 1 to 7, at least one of the plurality of measurement apparatuses determines whether or not it has received both of the first pulse and the second pulse included in the first group of pulses included in the trigger signal, and the transmitter transmits again the trigger signal to the plurality of measurement apparatuses in accordance with a result of determination.

According to the data measurement system described in Clause 8, even when a signal receiver fails to normally receive both of the first pulse and the second pulse, an additional trigger signal can be transmitted and the data measurement system can normally operate.

(Clause 9) In the data measurement system described in any one of Clauses 1 to 7, at least one of the plurality of measurement apparatuses determines whether or not it has received both of the first pulse and the second pulse included in the second group of pulses included in the trigger signal, and the transmitter transmits again the trigger signal to the plurality of measurement apparatuses in accordance with a result of determination.

According to the data measurement system described in Clause 9, even when a signal receiver fails to normally receive both of the first pulse and the second pulse, an additional trigger signal can be transmitted and hence the data measurement system can normally operate.

(Clause 10) A method according to another aspect relates to a method of performing data processing of measurement data in a data measurement system including a plurality of measurement apparatuses. The data measurement system includes a transmitter that transmits a trigger signal associated with the data processing and a data processing apparatus. The trigger signal includes a first group of pulses indicating start timing of the data processing and a second group of pulses indicating end timing of the data processing. The method includes i) wirelessly transmitting, by the transmitter, the trigger signal to the plurality of measurement apparatuses, ii) obtaining, by the data processing apparatus, data sets which are measured during a period between the start timing and the end timing, and iii) temporally aligning, by the data processing apparatus, the data sets with each other by aligning start timings of the data sets with each other and aligning end timings of the data sets with each other to obtain processed measurement data from the plurality of measurement apparatuses. Each of the first group of pulses and the second group of pulses includes a first pulse and a second pulse successively transmitted at a prescribed interval. The first pulse and the second pulse are different from each other in pulse width. The start timing is timing distant by a first prescribed time period from start of the first pulse in the first group of pulses or timing distant by a second prescribed time period from start of the second pulse in the first group of pulses. The end timing is timing distant by the first prescribed time period from start of the first pulse in the second group of pulses or timing distant by the second prescribed time period from start of the second pulse in the second group of pulses.

According to the method described in Clause 10, the trigger signal (the first group of pulses and the second group of pulses) transmitted from the transmitter to each measurement apparatus includes two pulsed signals different from each other in pulse width. So long as each measurement apparatus is able to receive at least one pulsed signal of the two pulsed signals in each of the trigger signal (the first group of pulses) transmitted at start time and the trigger signal (the second group of pulses) transmitted at end time, the data processing apparatus can determine start timing and end timing for synchronization. Imperfect synchronization due to poor reception of the trigger signal in the measurement apparatus can thus be lessened and measurement data can more reliably be synchronized on a time-series basis.

(Clause 11) The method described in Clause 10 includes determining, after the transmitting the trigger signal, whether at least one of the first pulse and the second pulse included in the first group of pulses included in the trigger signal has been received and transmitting again, by the transmitter, the trigger signal to the plurality of measurement apparatuses in accordance with a result of determination.

According to the method described in Clause 11, even when a signal receiver fails to normally receive both of the first pulse and the second pulse, an additional trigger signal can be transmitted and hence the data measurement system can normally operate.

(Clause 12) The method described in Clause 10 includes determining, after the transmitting the trigger signal, whether at least one of the first pulse and the second pulse included in the second group of pulses included in the trigger signal has been received and transmitting again, by the transmitter, the trigger signal to the plurality of measurement apparatuses in accordance with a result of determination.

According to the method described in Clause 12, even when a signal receiver fails to normally receive both of the first pulse and the second pulse, an additional trigger signal can be transmitted and hence the data measurement system can normally operate.

(Clause 13) A data measurement system according to another aspect includes a plurality of measurement apparatuses, a data processing apparatus that performs data processing of data sets obtained from the plurality of measurement apparatuses, respectively, and a transmitter that wirelessly transmits a trigger signal associated with the data processing to the plurality of measurement apparatuses. The data processing apparatus obtains the data sets which are measured during a period between start timing and end timing and temporally align the data sets with each other by aligning start timings of the data sets with each other and aligning end timings of the data sets with each other to obtain processed measurement data from the plurality of measurement apparatuses. The trigger signal corresponds to at least one of the start timing of the data processing and the end timing of the data processing. The data measurement system determines whether or not at least one of the measurement apparatuses has received the trigger signal. The transmitter transmits again the trigger signal to the plurality of measurement apparatuses in accordance with a result of determination.

(Clause 14) A method according to another aspect relates to a method of performing data processing of measurement data in a data measurement system including a plurality of measurement apparatuses. The data measurement system includes a transmitter that transmits a trigger signal associated with the data processing and a data processing apparatus. The method includes wirelessly transmitting, by the transmitter, the trigger signal to the plurality of measurement apparatuses, obtaining, by the data processing apparatus, data sets which are measured during a period between the start timing and the end timing, temporally aligning, by the data processing apparatus, the data sets with each other by aligning start timings of the data sets with each other and aligning end timings of the data sets with each other to obtain processed measurement data from the plurality of measurement apparatuses, determining whether or not the trigger signal has been received after the transmitting the trigger signal, and transmitting again, by the transmitter, the trigger signal to the plurality of measurement apparatuses in accordance with a result of determination.

According to the system and the method described in Clauses 13 and 14, even when the trigger signal cannot normally be received, an additional trigger signal can be transmitted and hence the data measurement system can normally operate.

It should be understood that the embodiments disclosed herein are illustrative and non-restrictive in every respect. The present invention is defined by the terms of the claims rather than the description of the embodiments above and is intended to include any modifications within the scope and meaning equivalent to the terms of the claims.

REFERENCE SIGNS LIST 10 data measurement system; 110 signal transmitter; 120, 120A to 120C, 120X signal receiver; 130, 130A, 130B measurement apparatus; 130X, 130Y video camera; 131, 151 CPU; 132 detector; 133, 136, 152 storage device; 135 image pick-up unit; 140 external storage medium; 150 data processing apparatus; 160 display; 170 controller; 121, 171 display unit

The invention claimed is:

1. A data measurement system comprising:
a plurality of measurement apparatuses;
a data processing apparatus that performs data processing of data sets obtained from the plurality of measurement apparatuses, respectively; and
a transmitter that wirelessly transmits a trigger signal associated with the data processing of the data sets to the plurality of measurement apparatuses, wherein
the trigger signal includes a first group of pulses indicating start timing of the data processing and a second group of pulses indicating end timing of the data processing,
the data processing apparatus obtains the data sets which are measured during a period between the start timing and the end timing, and temporally align the data sets with each other by aligning start timings of the data sets with each other and aligning end timings of the data sets with each other to obtain measurement data from the plurality of measurement apparatuses, each of the first group of pulses and the second group of pulses includes a first pulse and a second pulse successively transmitted at a prescribed interval,
the first pulse and the second pulse are different from each other in pulse width,
the start timing is timing distant by a first prescribed time period from generation of the first pulse in the first group of pulses or the timing distant by a second prescribed time period from generation of the second pulse in the first group of pulses, and
the end timing is the timing distant by the first prescribed time period from generation of the first pulse in the second group of pulses or the timing distant by the second prescribed time period from generation of the second pulse in the second group of pulses.

2. The data measurement system according to claim 1, wherein
the first prescribed time period and the second prescribed time period are set such that the timing distant by the first prescribed time period from generation of the first pulse in the first group of pulses and the second group of pulses and the timing distant by the second prescribed time period from generation of the second pulse in the first group of pulses and the second group of pulses are aligned with each other.

3. The data measurement system according to claim 1, wherein
each of the first group of pulses and the second group of pulses further includes a third pulse different in the pulse width from the first pulse and the second pulse,
the start timing is the timing distant by the first prescribed time period from generation of the first pulse in the first group of pulses, the timing distant by the second prescribed time period from generation of the second pulse in the first group of pulses, or the timing distant by a third prescribed time period from generation of the third pulse in the first group of pulses,
the end timing is the timing distant by the first prescribed time period from generation of the first pulse in the second group of pulses, the timing distant by the second prescribed time period from generation of the second pulse in the second group of pulses, or the timing distant by the third prescribed time period from generation of the third pulse in the second group of pulses, and
the first prescribed time period, the second prescribed time period, and the third prescribed time period are set such that the timing distant by the first prescribed time period from generation of the first pulse in the first group of pulses and the second group of pulses, the timing distant by the second prescribed time period from generation of the second pulse in the first group of pulses and the second group of pulses, and the timing distant by the third prescribed time period from generation of the third pulse in the first group of pulses and the second group of pulses are aligned with one another.

4. The data measurement system according to claim 1, wherein
the transmitter is included in the plurality of measurement apparatuses.

5. The data measurement system according to claim 1, wherein
each of the plurality of measurement apparatuses includes an environmental sensor that measures environmental information, a biological sensor that measures biological information or an image sensor for imaging.

6. The data measurement system according to claim 5, wherein
each of the plurality of measurement apparatuses includes a storage device where the measurement data measured thereby is stored, and a wired connection for transmission of a signal from the environmental sensor, the biological sensor, or the image sensor to the storage device.

7. The data measurement system according to claim 1, further comprising a display on which the measurement data is presented to a user.

8. The data measurement system according to claim 1, wherein
at least one of the plurality of measurement apparatuses determines whether or not it has received both of the first pulse and the second pulse included in the first group of pulses included in the trigger signal, and the transmitter transmits again the trigger signal to the plurality of measurement apparatuses in accordance with a result of determination.

9. The data measurement system according to claim 1, wherein
at least one of the plurality of measurement apparatuses determines whether or not it has received both of the first pulse and the second pulse included in the second group of pulses included in the trigger signal, and the transmitter transmits again the trigger signal to the plurality of measurement apparatuses in accordance with a result of determination.

10. A method of performing data processing of measurement data in a data measurement system including a plurality of measurement apparatuses, the data measurement system including a transmitter that transmits a trigger signal associated with the data processing of the measurement data and a data processing apparatus, the trigger signal including a first group of pulses indicating start timing of the data processing and a second group of pulses indicating end timing of the data processing, the method comprising:
wirelessly transmitting, by the transmitter, the trigger signal to the plurality of measurement apparatuses;
obtaining, by the data processing apparatus, data sets which are measured during a period between the start timing and the end timing; and
temporally aligning, by the data processing apparatus, the data sets with each other by aligning start timings of the data sets with each other and aligning end timings of the data sets with each other to obtain the measurement data from the plurality of measurement apparatuses, wherein
each of the first group of pulses and the second group of pulses includes a first pulse and a second pulse successively transmitted at a prescribed interval,
the first pulse and the second pulse are different from each other in pulse width,
the start timing is timing distant by a first prescribed time period from generation of the first pulse in the first group of pulses or the timing distant by a second prescribed time period from generation of the second pulse in the first group of pulses, and
the end timing is the timing distant by the first prescribed time period from generation of the first pulse in the second group of pulses or the timing distant by the second prescribed time period from generation of the second pulse in the second group of pulses.

11. The method according to claim 10, comprising:
determining, after the transmitting the trigger signal, whether at least one of the first pulse and the second pulse included in the first group of pulses included in the trigger signal has been received; and
transmitting again, by the transmitter, the trigger signal to the plurality of measurement apparatuses in accordance with a result of determination.

12. The method according to claim 10, comprising:
determining, after the transmitting the trigger signal, whether at least one of the first pulse and the second pulse included in the second group of pulses included in the trigger signal has been received; and
transmitting again, by the transmitter, the trigger signal to the plurality of measurement apparatuses in accordance with a result of determination.

* * * * *